United States Patent [19]
Koch et al.

[11] Patent Number: 5,954,401
[45] Date of Patent: Sep. 21, 1999

[54] RECLINING SEAT AND OTTOMAN SYSTEM FOR AIRCRAFT INCLUDING AMENITY CABINET

[75] Inventors: Roger Koch, Miami Shores; Michael L. Oleson, Ft. Lauderdale, both of Fla.

[73] Assignee: Aircraft Modular Products, Inc., Miami, Fla.

[21] Appl. No.: 08/929,333

[22] Filed: Aug. 30, 1997

[51] Int. Cl.⁶ ..................................................... B60N 2/02
[52] U.S. Cl. ................ 297/354.13; 297/184.14; 297/188.01; 297/147; 297/423.1
[58] Field of Search ............................... 297/354.13, 342, 297/423.44, 423.41, 68, 188.01, 184.14, 184.11, 184.1, 188.21, 184.13, 184.17, 423.25, 135, 147, 423.1, 217.1; 312/235.2, 235.5, 235.9; 244/122 R; 296/65.01

[56] References Cited

U.S. PATENT DOCUMENTS

| | | | |
|---|---|---|---|
| 142,418 | 9/1873 | Taylor | 312/235.2 |
| 542,659 | 7/1895 | Richardson | 297/217.1 X |
| 1,385,242 | 7/1921 | Carden | 297/217.1 |
| 2,754,888 | 7/1956 | La Palme | 297/354.13 |
| 3,074,759 | 1/1963 | Bergenwall | 297/342 X |
| 3,227,491 | 1/1966 | Conrad | 297/423.41 X |
| 4,229,040 | 10/1980 | Howell et al. | 297/248 X |
| 5,597,199 | 1/1997 | Hoffman et al. | 297/423.41 X |

FOREIGN PATENT DOCUMENTS

| | | | |
|---|---|---|---|
| 2052960 | 2/1981 | United Kingdom | 297/188.21 |

*Primary Examiner*—Milton Nelson, Jr.
*Attorney, Agent, or Firm*—Malloy & Malloy, P.A.

[57] ABSTRACT

A system including a chair assembly and an ottoman assembly used to seat or otherwise support an individual wherein the subject system is particularly adapted for use on either commercial or multi-passenger private aircraft and is specifically structured to enhance the overall comfort and privacy of a passenger when utilizing the system as well as maximize the use of passenger space by providing access to certain amenities thereby defining an effective and comfortable environment for the passenger. Portions of the ottoman and chair assemblies are specifically structured for positioning toward and away from one another into a completely reclined or horizontal support position so as to allow the passenger or occupant to assume such a position, as when resting or sleeping. A privacy shroud structure is also included with the subject assemblies and is selectively positionable so as to greatly enhance the privacy of an occupant of the system and restrict any disturbing light from entering the subject privacy shroud.

16 Claims, 3 Drawing Sheets

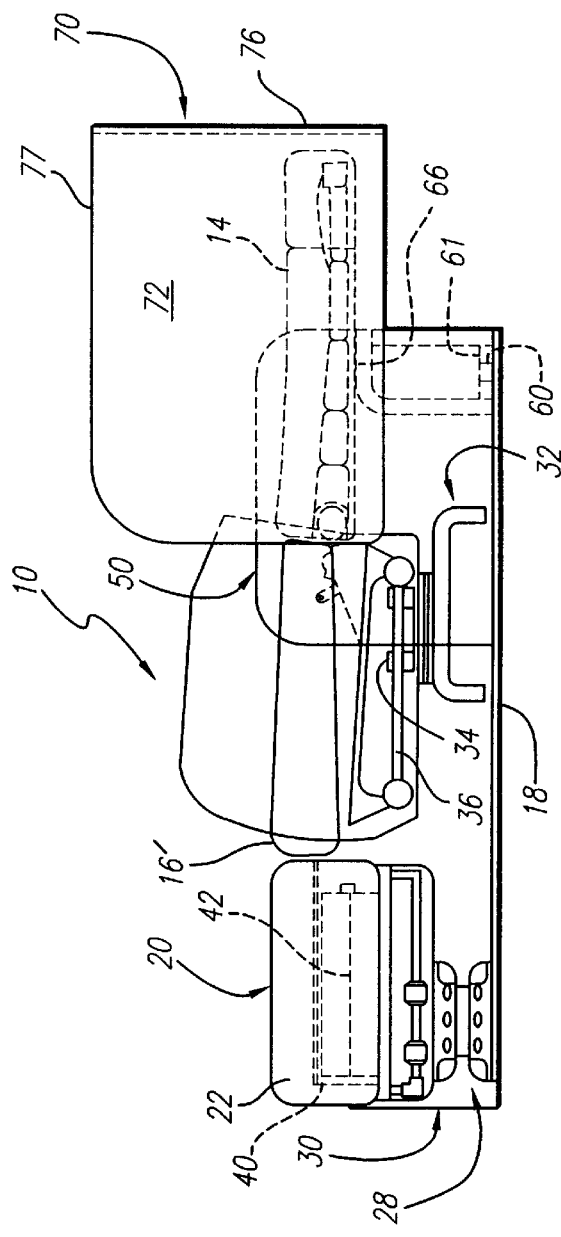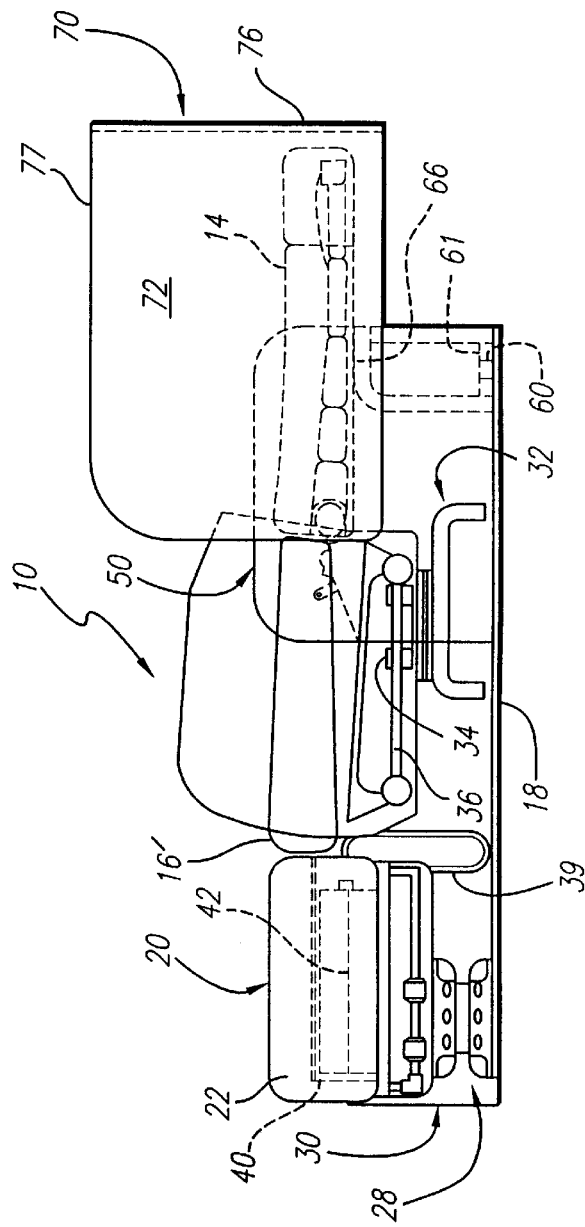

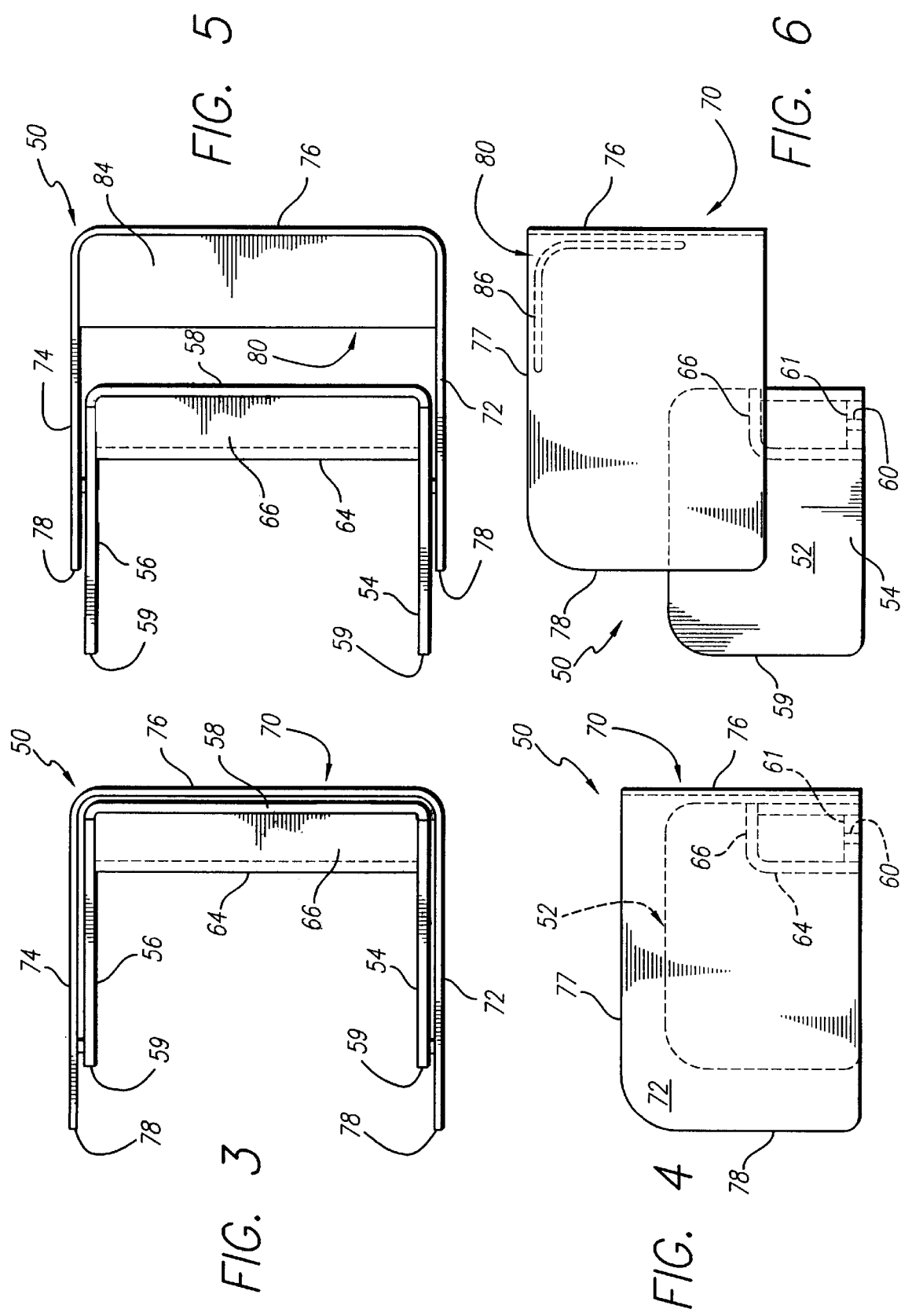

RECLINING SEAT AND OTTOMAN SYSTEM FOR AIRCRAFT INCLUDING AMENITY CABINET

BACKGROUND OF THE INVENTION

1. Field of the Invention

The present invention relates to a system used for the support and occupancy of a passenger in either commercial or private aircraft and which is specifically structured to greatly enhance the comfort of the passenger, by allowing he or she to assume a fully reclined positioned, as well as to increase the privacy of the passenger when he or she assumes that position. In addition, the present invention is specifically structured to provide a passenger with an enlarged, functional and user-friendly space to perform work-oriented tasks, for example. The present invention accomplishes these objectives while simultaneously meeting the stringent crash testing standards of the Federal Aviation Administration ("FAA") and the constraints of both space and weight which affect aircraft and aircraft components.

2. Description of the Related Art

Due to the wide spread popularity of air travel, and to the fact that many flights today may last eight or more hours, there is an increasing demand for aircraft chair structures and related equipment used by a passenger to be more comfortable and user friendly. Perhaps in recognition of this demand, most commercial aircraft available today offer passenger chair assemblies which at least partially recline. In such assemblies, the backrest portion is allowed to tilt or angle rearwardly to a certain degree. However, the amount of rearward positioning or the angle of recline is normally limited by the paucity of space allowed to each passenger. Thus, a complete horizontal positioning of the backrest relative to the seat portion of existing chair structures is generally not permitted in a majority of aircraft due to interference with rearwardly positioned passenger seats. This is particularly true in the economy section of the passenger cabin of a commercial aircraft. Similarly, it is also true that while many aircraft available today provide a passenger with a small table or tray structure, the limited surface area of such devices negatively impacts the comfort of the passenger as he or she tries to eat a meal and/or carry out any type of work-oriented tasks.

It will be appreciated that in the "first class" or "business class" sections of commercial aircraft, as well as in private, multi-passenger aircraft, and particularly those used to fly long distances or overseas, strides have been made to provide passengers with more comfortable seating and related equipment. Many include reclining chair structures which attempt to add to the overall comfort of the passenger and otherwise enhance the overall surroundings. Passengers who are frequent flyers for business reasons and/or who otherwise routinely travel long distances prefer to fly in and will pay a premium to fly in "first" class or in a "business" class wherein these more luxurious accommodations are found, including larger sized passenger seats which are typically capable of reclining either to or close to a fully reclined position.

Even so, there remains a significant need in the art for improved seating assemblies and related equipment so as to provide for the additional or enhanced comfort of passengers traveling within an aircraft. Any such seating assemblies and related equipment must also provide for the safety of the passenger, and in that regard, must be of strong material or design so as to successfully pass the stringent crash testing requirements of the Federal Aviation Administration ("FAA"). Further, any such seating assemblies and related equipment must also accommodate the limited space available on an aircraft, as well as the desire to limit the weight of the materials utilized to form such assemblies and equipment, so as to maximize the fuel economy of the aircraft, i.e., to lessen, as much as possible, the weight of the aircraft.

In addition to these concerns, and as an example, it would be ideal to provide an aircraft seating assembly which is capable of assuming a fully reclined position to permit a passenger to comfortably rest or sleep, with his or her legs in an off the floor or elevated attitude. Any such aircraft seating assembly should be easily maneuverable into and out of the reclined position and capable of providing adequate leg room and passing room when in a generally upright position. Similarly, it would be ideal to provide an aircraft seating assembly which is capable of increasing the overall privacy of a passenger, whenever that is desired, e.g. when he or she wants to sleep. In addition, other desired characteristics of an improved passenger chair assembly should be directed to amenities during periods of activity, such as an enlarged, functional and user-friendly table surface area to perform work-oriented tasks, when desired and/or to store work-oriented equipment when not in use. Accordingly, there remains a substantial need in the art for a system which is capable of efficiently and effectively maximizing a passenger's space in either commercial or private aircraft. Such a preferred system must meet all the requisite standards associated with aircraft design while substantially increasing the comfort, privacy and the amenities available to the passengers.

SUMMARY OF THE INVENTION

The present invention relates to a system for providing enhanced comfort to passengers within an aircraft, along with a degree of privacy not heretofore available, while simultaneously providing for the passenger's safety. The system of the present invention is specifically structured to be adaptable for use in commercial aircraft as well as the more luxuriously appointed private aircraft typically suited for multi-passengers.

More specifically, the system of the present invention includes a chair assembly having a seat portion and a backrest portion, wherein the backrest portion is movable relative to the seat portion so as to assume any one of a plurality of angularly oriented and/or reclined positions. In the preferred embodiment, the chair assembly is structured to allow the backrest portion to assume a completely reclined or at least substantially horizontally-oriented position relative to the seat portion. In the fully reclined position, the passenger will be allowed to assume a completely reclined or substantially horizontal position which is more conducive to long hours of rest or sleep. In the preferred embodiment, the chair assembly additionally includes an ottoman assembly structured to be movable between a first position which cooperates with the fully reclined chair assembly to support the feet and lower leg portions of the passenger, and a second position which provides ample leg room to the passenger and/or room for permitting another passenger to pass in front of the passenger and if desired, to occupy and be supported by the ottoman assembly for conducting a conversation. Preferably, the chair assembly and the ottoman assembly are structured to move or "track" independently of one another, that is, towards one another to form the fully reclined position of the aircraft seating system and away from one another, if desired, to provide for adequate leg room when the chair assembly is moved to the upright position. That is, the chair assembly may be independently moved to the upright position, and the ottoman assembly may if desired, be independently moved in a direction away from the chair assembly so as to assume a spaced apart relation thereto, which forms a space between the ottoman assembly and the seat portion of the chair assembly. This space, of course, is sufficient to allow adequate leg room and/or movement of the passenger or occupant into and out of the vicinity of either assembly, and further, to allow access to various amenities such as, but not limited to a work table or tray, telephone, lap top computers, etc. which are preferably maintained in an adjacently positioned storage or amenity cabinet. Naturally, both the ottoman assembly and the chair assembly are preferably structured to include comfortable cushions and the like, thereby further adding to the comfort of the occupant or passenger whether in a reclined or upright position.

The present invention preferably includes an amenity cabinet located immediately adjacent to a common side of both the ottoman assembly and the chair assembly. In the preferred embodiment, the amenity cabinet includes an at least partially hollow interior configuration structured to accept the storage of a number of items, but most preferably, an enlarged work tray or table having an adequate work surface when the table is brought from its stored position on the interior of the amenity cabinet to an outwardly extended position. In such an extended position, the table is disposed in the space between the ottoman assembly and the seat portion of the chair assembly, with adequate leg room provided for the passenger beneath the table in a somewhat conventional fashion. The amenity cabinet and the associated work table are preferably structured to have sufficient versatility to provide an efficient work station as well as adequate presentation of a food service, as when meals are being served. Also, it is preferred that the amenity cabinet be structured to permit numerous articles to be stored therein such as computers and like equipment, telephones, and to include power take-off jacks if desired, for the operation of various electrical instruments. Such a versatility in design thereby enhances the passengers' environment as that of both an office or work space as well as an area where more casual activities can be conducted.

The aircraft seating system of the present invention preferably also includes a privacy shroud which is positionable selectively between a stored position and an operative position. The privacy shroud preferably includes a shield portion which in the operative position substantially surrounds and overlies the backrest portion of the chair assembly when the backrest portion is in its fully reclined position. The configuration and dimension of the shield portion of the privacy shroud is preferably such as to provide privacy focused to the torso and/or head regions of a passenger supported on the reclined chair assembly in a manner which will additionally control or regulate the amount of light to which he or she is exposed.

It shall be noted that each or all of the various structures as set forth above can be structured for selective positioning by mechanical means. In such case manual positioning of the chair structure, into and out of a reclined position; the ottoman, towards and away from the chair structure; the amenity cabinet and contents; into and out of an operative position and the privacy shroud, between its stored position and operative position; may be easily accomplished. Ultimately, electronic positioning means for each of the above noted structures may be utilized to accomplish the structural components as outlined above. In this latter embodiment, access to the individual control facilities for each of the above noted structural components may be accomplished by means of a conveniently and substantially centrally located control panel.

A primary object of the present invention is to provide an aircraft seating system and related equipment for a passenger's use in either a commercial or private aircraft which significantly improves the overall comfort of the passenger.

It is also an object of the present invention is to provide an aircraft seating system which increases the overall comfort of the passenger by allowing him to assume a fully reclined, substantially horizontal position wherein his body is supported along substantially its entire length, including with his or her legs in an off-the-floor or elevated attitude.

Yet another object of the present invention is to provide an aircraft seating assembly which is easily maneuverable into and out of the fully reclined position and which is further capable of providing adequate leg room and passing room when in a generally upright position.

Still another object of the present invention is to provide an aircraft seating system which may enhance, selectively, the privacy of a passenger occupying the subject system when in a reclined, resting positing.

It is a further object of the present invention to provide an aircraft seating system and related equipment which is sufficiently strong to meet all of the FAA strength and crash worthiness requirements, but yet which is sufficiently lightweight so as to be economical in terms of allowing fuel efficiency suitable for use on an aircraft.

Yet another object of the present invention to provide an aircraft seating system which includes an amenity cabinet structured to both store and operatively support or position a work table for use with various equipment, instruments, etc., thereby enhancing the versatility of the passenger's surrounding environment and providing an efficient and comfortable office space or work station.

These and other objects, features and advantages of the present invention will become more readily apparent from the detailed description of a preferred embodiment, which follows.

BRIEF DESCRIPTION OF THE DRAWINGS

For a fuller understanding of the nature of the present invention, reference should be had to the following detailed description taken in connection with the accompanying drawings in which:

FIGS. 2 and 2A are side views of the invention shown in FIG. 1 wherein a chair assembly thereof is illustrated in a reclined position.

FIG. 3 is a top view of a preferred embodiment of a privacy shroud according to the present invention.

FIG. 4 is a side view of the invention illustrated in FIG. 3.

FIG. 5 is a top view of the invention illustrated in FIGS. 3 and 4 illustrating an operative position.

FIG. 6 is a side view of the invention shown in FIG. 5.

Like reference numerals refer to like parts throughout the several views of the drawings.

DETAILED DESCRIPTION OF THE PREFERRED EMBODIMENT

Figure 1:
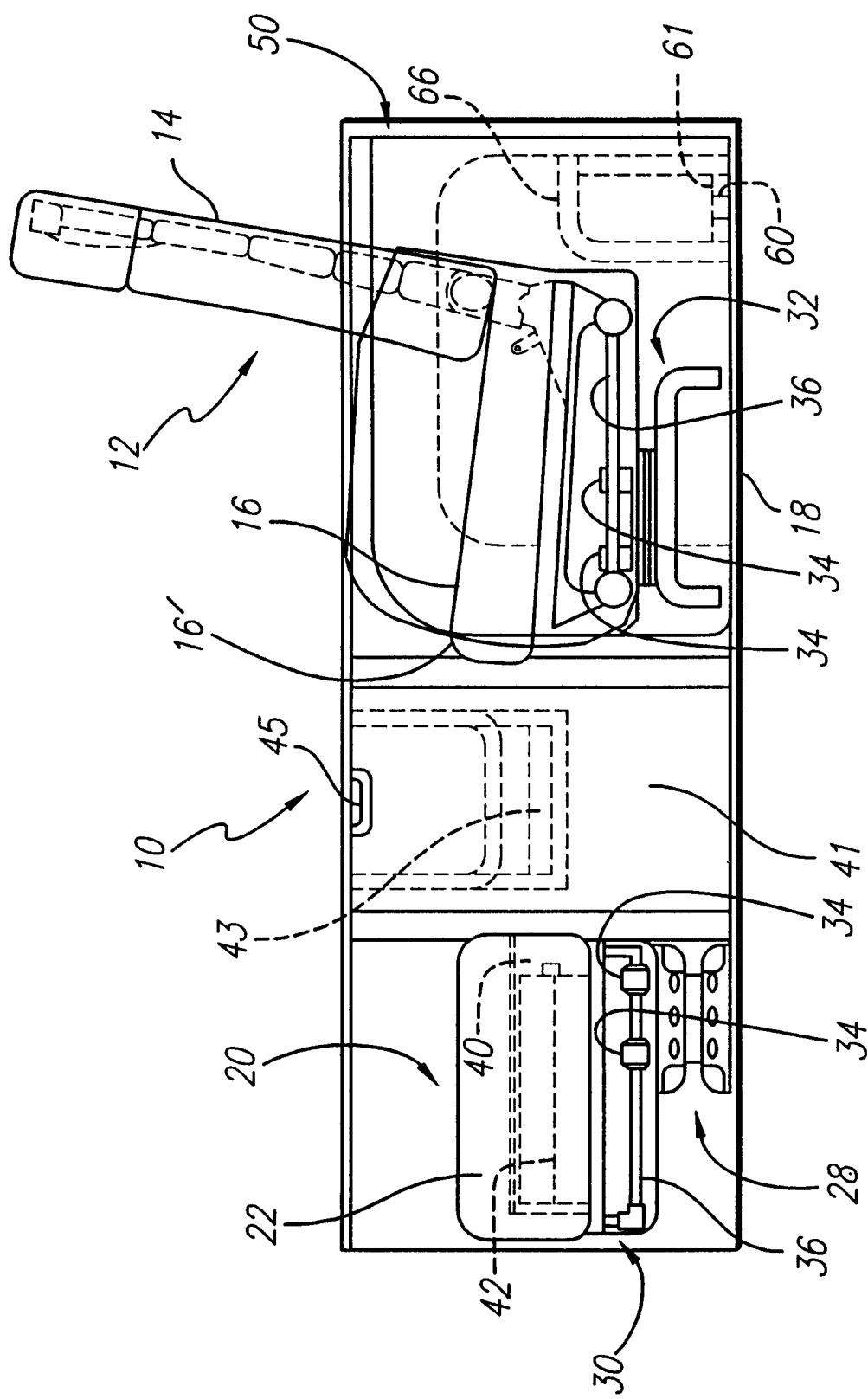
FIG. 1 is a side view of one embodiment of the system of the present invention wherein a chair assembly thereof is illustrated in an upright, operative position.

As shown in the accompanying drawings, the present invention is directed towards a aircraft seating system, generally indicated by reference numeral 10, which is designed to support a passenger thereon, within an aircraft. The system 10 of the present invention is suitable for use in either commercial aircraft or in multi-passenger private aircraft.

Referring to FIGS. 1 and 2, the system of the present invention is seen to initially comprise a chair assembly, generally indicated by reference numeral 12, which includes a seat portion, 16, and a backrest portion 14. The backrest portion 14 is movably mounted relative to seat portion 16 so as to be selectively positionable between an upright position, as shown in FIG. 1, and a fully reclined position, as shown in FIG. 2. In the fully reclined position, the seat portion 16 and the backrest portion 14 are preferably disposed at substantially the same height or level relative to the floor or other support surface 18 of the aircraft, and are collectively oriented in a substantially horizontal position.

The system 10 of the present invention further includes an ottoman assembly 20. As illustrated in FIG. 1, the ottoman assembly 20 can be disposed a pre-determined, spaced apart distance from the seat portion 16 of the chair assembly 12, so as to provide adequate room for the legs of the passenger for movement or positioning of the passenger into and out of the chair assembly 12. The ottoman assembly 20 includes a support portion 22 disposed to support the feet and/or legs of a passenger of the chair assembly 12. For reasons to be explained in greater detail hereinafter, the support portion 22 of the ottoman assembly 20 is preferably positioned at a height which is substantially equal to that of the seat portion 16 as well as the backrest portion 14 when the latter is disposed in its fully reclined position, shown in FIG. 2.

A unique feature of the present invention is the ability to selectively position the chair assembly 12 and the ottoman assembly 20, either towards or away from one another so as to assume a variety of relative positions, and so as to vary the space between the seat portion 16 of the chair assembly 12 and the ottoman assembly 20. Preferably, this space can be varied from a position of maximum separation, as shown in FIG. 1, to a position where the support portion 22 of the ottoman assembly 20 is contacting or in at least an immediately adjacent relation to the leading end 16' of the seat portion 16, as shown in FIG. 2. The relative, independent movement of the ottoman assembly 20 and the chair assembly 12 into and out of the positions shown in FIGS. 1 and 2 allows the formation of a substantially horizontal support position.

With specific reference to FIG. 2, the positioning of the support portion 22 of the ottoman assembly 20 into its immediately adjacent position to the seat portion 16 serves to define what may be termed a segmented, horizontal support surface comprising the exposed cushion surface of the support portion 22 of the ottoman assembly 20, the seat portion 16 of the chair assembly and the backrest portion 14 of the chair assembly 12. The orientation of these three elements in the position shown in FIG. 2, serves to allow a passenger to assume a fully reclined and substantially horizontal position along the aforementioned horizontal segmented support surface. The comfort of the passenger is thereby significantly increased, especially during long flights or periods of rest or sleep.

The movement or positioning of either the chair assembly 12 or the ottoman assembly 20 is accomplished by virtue of a base portion, 28 being disposed in movable engagement and supporting an undercarriage, 30 of the ottoman assembly 20, as well as a similarly constructed anchor structure, 32 movably connected to and supporting the undercarriage, 34 of the chair assembly 12. In the preferred embodiment, both the base portion 28 and the anchor structure 32 are fixedly secured to the floor or other support surface 18 of the aircraft. More specifically, in the preferred embodiment, both the base structure 28 and the anchor structure 32 have an under or connecting portion which is specifically adapted to fit within spaced apart, substantially parallel preformed tracks which are normally found in the floor of both commercial aircraft and multi-passenger private aircraft. Dependent upon the type of aircraft, the spacing between such parallel tracks formed in the floor portion 18 of the aircraft will, of course, vary depending upon the style, size, model, etc. of the aircraft. Both the base portion 28 and the anchor structure 32 associated with the ottoman assembly 20 and the chair assembly 12, respectively, are preferably structured to be easily adapted to fit the track assembly associated with the various different types of aircrafts by the inclusion of an adjustable or variable dimensioned spar member which interconnects spaced apart portions thereof. Other features of both the base portion 28 and the anchor structure 32 include a gripping assembly comprising a plurality of or at least two gripping sleeves, 34. The sleeves 34 are dimensioned to surround and allow sliding engagement therethrough of support members, 36 associated with each of the undercarriages 20 and 34. In each of the base portion 28 and anchor structure 30, there are at least two pairs of sleeves 34, each sleeve of each pair being disposed in substantially aligned relation to one another so as to as to slidingly receive and support an elongated, linearly configured support member 36. Such support members 36 may be in form of steel or aluminum tubing or of other materials of sufficient strength.

In an alternative embodiment, adding to the versatility of the present invention, the chair assembly 12 may be provided with a footrest, 39 which is selectively positionable between a retracted or stored position illustrated in FIG. 2-A and a supporting position (not shown for purposes of clarity). The supporting position may be defined by an outwardly extending, and substantially horizontal orientation of the footrest 39 at a height approximate to that of the support position 22. When in such position, the footrest 39 is disposed and structured to support the feet and lower legs of the passenger. The footrest 39 may be selectively used when it is not practical or desirable to position and utilize the ottoman assembly as set forth above.

Other features of the present invention preferably include the provision of an amenity cabinet, indicated by the reference numeral 41 and shown in FIG. 1. The amenity cabinet 41 is preferably disposed adjacent a common side of each of the chair assembly 12 and the ottoman assembly 20, on or as part of the side wall of the aircraft. Preferably, the amenity cabinet 41 has at least a partially hollow interior for the storage therein of a table structure 43 shown in FIG. 1 in its stored position. When so stored, the table is arranged in a somewhat vertical orientation. Adequate handle or attachment means are provided as at 45 to open the amenity cabinet and selectively position the table 42 in an outwardly extending operative position. In such an operative position, the table is disposed in the space between the seat portion 16 and the support portion 22 of the ottoman assembly 20 and in an overlying relation to a leg space of the passenger. Preferably, the amenity cabinet 41 and work table 43 are dimensioned and configured to have sufficient versatility to present an efficient work station and further, numerous articles can be stored within the cabinet 41 or operatively positioned on table 43. These might include computers and related equipment, telephone and power take-off jacks for the operation of various electrical instruments. Such versatility in design serves to maximize the passenger's space to enhance the surrounding environment as that of both an efficient office work space as well as a comfortable area where more casual activities may be conducted.

Other structural features of the system shown in FIGS. 1 and 2 include the provision of additional storage space as at 40. In particular, the ottoman assembly 20 is structured to include an at least partially hollow interior section 40 which is accessible beneath the support portion 22 thereof. This storage compartment 40 may house a briefcase or other piece or pieces of luggage or equipment 42 which may be needed to refer to or to utilize during a flight.

Referring initially to FIGS. 1 and 2, in the preferred embodiment, the aircraft seating system of the present invention includes a shroud assembly, 50, for providing privacy to a passenger, whenever that is desired. As best illustrated in FIG. 6, the shroud assembly 50 preferably includes an attachment portion, 52, having a lower portion thereof secured to the floor or other support surface 18 of the aircraft in a fixed relation to the chair assembly 12. With reference to FIGS. 3–6, the attachment structure 52 also includes in the preferred embodiment oppositely disposed, spaced apart side panels, 54 and 56, and an end portion, 58 at least partially interconnecting the side panels 54 and 56 along a commonly positioned end thereof. The opposite or front end of the attachment structure 52 comprises an open end, 59 which is dimensioned to allow passage or extension of a least a portion of the chair assembly 12 therethrough as clearly shown in both FIGS. 1 and 2. Fixed attachment or securement of the shroud assembly 50 occurs by passing connectors as at 60 through a bottom attachment plate (FIGS. 1, 2, 4 and 6) in order to mount the plate, and therefore, fixedly secure the attachment portion 52 within the aforementioned pre-formed tracks commonly found in the floor 18 of the aircraft. It should be noted as best shown in FIGS. 2, 4 and 6 that a backrest support, 64 is preferably included and is structured to extend across at least a portion of the closed end 58 of the attachment portion 52. Thus, the support structure 64 is preferably positioned such that the backrest portion 14 of the chair assembly 12, when in its fully reclined position, as shown in FIG. 2, is resting in supported relation on an upper portion 66 of the support structure 64.

In addition, the shroud assembly 50 includes a shield portion 70. Adequate coupling exists between the attachment portion 52 and the shield portion 70 such that shield portion 70 is movably secured or coupled to the attachment structure 52 and is permitted to move relative thereto between a stored position shown in FIGS. 1, 3 and 4, and the shielding position shown in FIGS. 2 and 6. When in the shielding position, the shield portion 70 preferably extends upwardly and outwardly from the attachment portion 52, and somewhat rearwardly of the chair assembly 12, in order to at least partially surround the backrest portion 14, when in its fully reclined position, as shown in FIG. 2. The shield portion 70 may have surrounding sidewalls at 72 and 74, which are spaced from one another as well as an end wall at 76, which closes off and interconnects oppositely disposed ones of the sidewalls 72 and 74. The top 77 of the shield portion 70 as well as the front end 78 thereof may be open so as to allow extension therethrough of the seat portion 16 as well as the backrest portion 14, especially when the backrest portion 14 is in its upright position, as shown in FIG. 1. However, a cover assembly 80 may be selectively positioned in covering relation to the open top so as to substantially overly the backrest portion 14 when the backrest is in its totally reclined position and the shield portion 70 is in its operative or shielding position. The existence of the cover assembly 80 serves to add privacy to a passenger of the ottoman assembly 20 and chair assembly 12, particularly when in the horizontal support position of FIG. 2, as well as to restrict the passage of light from entering into the area where the passenger rests on the chair assembly 12.

The cover assembly 80, in one embodiment will preferably take the form of an elongated but flexible material sheet or cover member, 84, designed to pass between an open or closed position relative to the open top 76 of the shield portion 70 so as to either open or close the open top 76 of the shield portion. The cover member 84 is preferably formed of a light impermeable material and travels in a preformed track 86 so as to allow the selective positioning of the cover member or structure 84 into and out of the aforementioned overlying relation to the backrest, when in its fully reclined position as shown in FIG. 2.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for selectively supporting a person in both an upright, seated position and a substantially horizontally reclined position within an aircraft, said system comprising:

a) a chair assembly including a seat and a backrest movably attached to one another, b) said backrest selectively positionable between an upright, substantially transverse relation to said seat and a reclining, substantially horizontally aligned relation thereto, c) an ottoman assembly including a support portion disposed in spaced, communicating relation to a front of said seat, d) said ottoman assembly and said chair assembly independently movable toward and away from one another, said ottoman assembly and said seat disposable into adjacent relation to one another to at least partially define a substantially horizontal support position, e) a shroud assembly having an attachment portion secured in a fixed position relative to said chair assembly and a shield portion movably connected to said attachment portion and positionable relative thereto into and out of a shielding position relative to said backrest when in said horizontal support position, f) said shielding position defined by said shield portion being disposed in a raised, outwardly extending relation to said attachment portion and in at least partially surrounding relation to said backrest when in said horizontal support position, g) said shield portion comprising two spaced apart side walls disposed adjacent opposite sides of said chair assembly, an end wall disposed in interconnecting relation to said side walls adjacent common ends thereof and an open end disposed opposite to said end wall, said open end disposed and dimensioned to allow extension of said chair assembly therethrough, h) said shroud assembly further comprising an at least partially open top dimensioned and disposed to allow extension of said backrest therethrough when said backrest is in an upright position, and i) a cover assembly positionable in at least partially closed relation to said open top and in substantially overlying, covering relation to said backrest when in said horizontal support position, whereby a person resting on said chair assembly when in said horizontal support position will be at least partially enclosed by said shroud assembly.

2. A system as recited in claim 1 wherein said horizontal support position is further defined by said backrest disposed in horizontally aligned relation to both said seat and said support portion of said ottoman assembly.

3. A system as recited in claim 2 wherein said support portion is disposed at a substantially equivalent height as said seat and said backrest when said backrest is in said reclined position.

4. A system as recited in claim 2 wherein said support portion of said ottoman assembly, said seat and said backrest collectively define a horizontal, segmented support surface sufficiently configured and dimensioned to totally support a person of adult size in a substantially horizontal, reclining position.

5. A system as recited in claim 1 wherein said chair assembly and said ottoman assembly include an anchor structure and a base structure respectively, and each being for securement to a floor of the aircraft.

6. A system as recited in claim 5 wherein said anchor structure is movably attached to an undercarriage of said chair assembly in movable support of said seat and backrest.

7. A system as recited in claim 6 wherein said base structure is movably attached to an undercarriage of said ottoman assembly in movable support of said support portion.

8. A system as recited in claim 7 wherein said support portion and said seat are each independently movable relative to said base structure and said anchor structure respectfully, towards and away from one another and into and out of said horizontal support position.

9. A system as recited in claim 7 wherein said anchor structure and base structure are fixedly secured within spaced apart, substantially parallel tracks preformed in the floor of an aircraft.

10. A system as recited in claim 1 further comprising an amenity cabinet disposed adjacent a common side of said chair assembly and said ottoman assembly and out of a path of travel of either when positioned toward or away from one another.

11. A system as recited in claim 10 wherein said amenity cabinet includes an at least partially hollow configuration and a table having a work surface formed thereon, said table selectively positionable between a stored position and an operative position.

12. A system for selectively supporting a person in both an upright, seated position and a substantially horizontally reclined position within an aircraft, said system comprising:

a) a chair assembly including a seat and a backrest movably attached to one another, b) said backrest selectively positionable between an upright, substantially transverse relation to said seat and a reclining substantially horizontally aligned relation thereto, c) an ottoman assembly including a support portion disposed in spaced communicating relation to a front of said seat, d) said ottoman assembly and said chair assembly independently movable toward and away from one another, said ottoman assembly and said seat disposable into adjacent relation to one another to at least partially define a substantially horizontal support position, e) said chair assembly and said ottoman assembly including an anchor structure and a base structure respectively, f) said anchor structure being movably attached to an undercarriage of said chair assembly in movable support of said seat and backrest and said base structure being movably attached to an undercarriage of said ottoman assembly in movable support of said support portion, and g) said anchor structure and said base structure each comprising a gripping assembly structured and disposed to be movably secured to said undercarriage of said chair assembly and said ottoman assembly, respectively.

13. A system as recited in claim 12 wherein said gripping assembly of each of said anchor structure and base structure comprises a plurality of sleeves; said undercarriage of each of said chair assembly and ottoman assembly includes spaced, substantially parallel support members disposed to extend along a direction of travel of said chair assembly and ottoman assembly as they move toward and away from one another.

14. A system as recited in claim 13 wherein support members of each of said undercarriages are configured and dimensioned to travel within and be movably supported by correspondingly positioned ones of said plurality of sleeves on said anchor structure and said base structure.

15. A system for selectively supporting a person in both an upright, seated position and a substantially horizontally reclined position within an aircraft, said system comprising:

a) a chair assembly including a seat and a backrest movably attached to one another, b) said backrest selectively positionable between an upright, substantially transverse position relative to said seat and a reclining, substantially horizontally aligned position in relation to said seat, c) an ottoman assembly including a support portion disposed in spaced communicating relation to a front of said seat, d) said ottoman assembly and said chair assembly independently movable toward and away from one another, and disposable into adjacent relation to one another to at least partially define a substantially horizontal support position, e) an amenity cabinet disposed adjacent a common side of said chair assembly and said ottoman assembly and out of a path of travel of either when positioned toward or away from one another, f) said amenity cabinet including an at least partially hollow configuration and a table having a work surface formed thereon, said table selectively positionable between a stored position and an operative position, and g) said stored position comprising said table disposed within said storage cabinet in a substantially vertically oriented position and said operative position defined by said table disposed in an outwardly extending position relative to said storage cabinet and substantially between said ottoman assembly and said chair assembly.

16. A system as in claim 15 wherein said table is connected to and supported primarily by said storage cabinet when in either said operative or stored positions.

* * * * *